March 15, 1938. E. S. CORNELL, JR 2,111,357
PIPE HANGER
Filed July 15, 1936  2 Sheets-Sheet 1
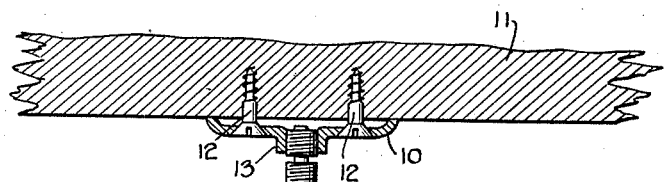
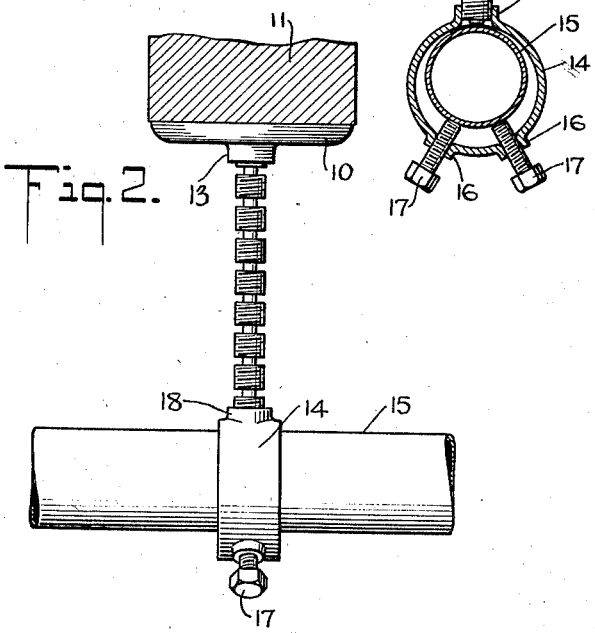
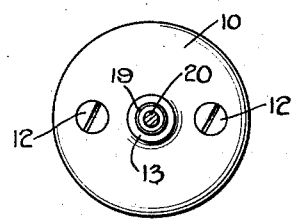
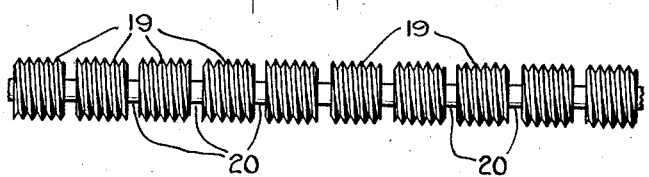
INVENTOR
Edward S. Cornell, Jr.
HIS ATTORNEY March 15, 1938.  E. S. CORNELL, JR  2,111,357
PIPE HANGER
Filed July 15, 1936  2 Sheets-Sheet 2
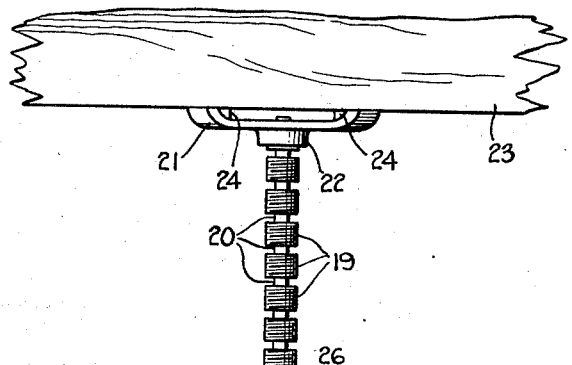
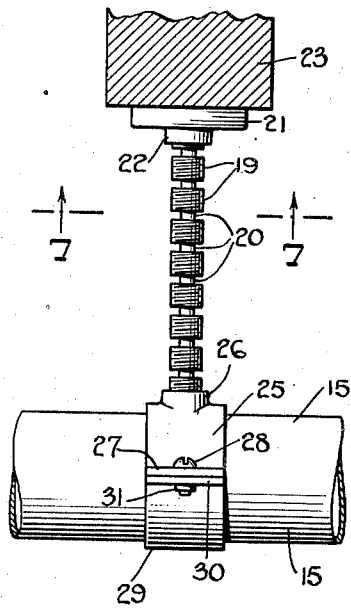
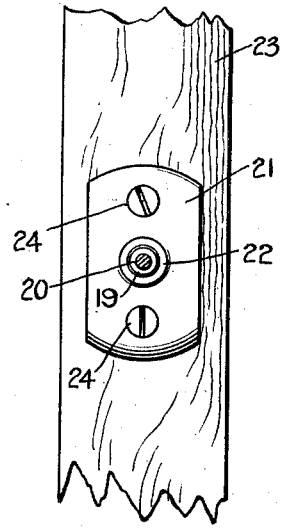
INVENTOR
Edward S. Cornell, Jr.
BY
HIS ATTORNEY Patented Mar. 15, 1938

2,111,357

UNITED STATES PATENT OFFICE 2,111,357

PIPE HANGER

Edward S. Cornell, Jr., Larchmont, N. Y., assignor to American Radiator Company, New York, N. Y., a corporation of New Jersey Application July 15, 1936, Serial No. 90,686

2 Claims. (Cl. 248—58)

My present invention relates to brackets and more particularly to an improved pipe hanger.

My present invention is adapted for use as a pipe hanger, and in which one of the component parts thereof comprises a member divided into a number of sections connected together by connecting links of reduced diameter. Such member may be made of indeterminate length divided into a plurality of individual sections preferably of substantially equal length. I may produce from such indeterminate length a member of the desired length, to fit any particular position, so that my improved hanger may be utilized in any situation. It is particularly adapted for use in hanging pipes from a ceiling or other similar place where the height of the ceiling or other similar place above the level of the pipe to be hung may vary considerably, and in which event my pipe hanger may be readily and easily adapted to fit the varying distances of the pipe from the ceiling, along the length of such pipe. Also with my improved hanger, the number of parts required to be kept in stock by a plumber or other artisan is reduced to a minimum, as it is only necessary to keep in stock the usual member to be fastened to the ceiling or other support, the usual collar to surround the pipe and a number of lengths of the specific member which is divided into a plurality of substantially equal sections. With such a stock on hand the plumber or other artisan is prepared to hang a pipe in practically any situation.

A feature of my invention is an improved pipe hanger in which an element thereof may be readily made from stock of indeterminate length.

A feature of my invention is a pipe hanger having one element thereof composed of a member divided into sections attached integrally to one another by a connecting link of reduced diameter.

A feature of my invention is an improved hanger having a suspending member comprised of a threaded rod divided into sections, secured together by integral members of reduced diameter.

In the accompanying drawings,

Fig. 1 is an elevation, partly in section, of a pipe hanger embodying my invention;

Fig. 2 is a side elevation of the structure shown in Fig. 1;

Fig. 3 is a section taken on the line 3—3 of Fig. 1;

Fig. 4 is an elevation of a section of the connecting member to extend between a supporting plate and a pipe supporting collar;

Fig. 5 is an elevation of another form of my invention;

Fig. 6 is a side elevation of the structure shown in Fig. 5, and

Fig. 7 is a section on the line 7—7 of Fig. 6.

Referring to the drawings, 10 designates a plate of any desired form, which is adapted to be secured to a support, as a beam 11 of a ceiling or other portion of a structure, by a plurality of screws 12. The plate 10 as shown in the drawings has the central portion provided with a downwardly extending member 13, such member being internally threaded.

14 designates a collar which surrounds a pipe 15 to be supported relative to the beam 11. The collar 14 is provided with internally threaded lugs 16 through which extend set screws 17. The set screws 17 are employed to engage with the pipe 15 and hold the same in adjusted position in the collar 14, as clearly shown in Fig. 1. Preferably the set screws 17 extend radially of the collar 14. Diametrically opposite the set screws 17, there is formed on the collar 14 an internally threaded tubular member 18. For the purposes of the present construction the diameter of the threads in the internally threaded member 18 is equal and similar to the diameter of the threads in the internally threaded member 13 on the plate 10.

Referring now to Fig. 4, there is shown a rod or bar of indeterminate length, such bar being composed of a plurality of individual threaded sections 19 of any desired length arranged in series relation. The diameter and pitch of the threads on the sections 19 are respectively equal to the diameter and pitch of thread in the members 13 and 18. The sections 19 are connected together by the sections 20 of reduced diameter, and such sections are of such a diameter as to be relatively frangible to readily permit the length of structure shown in Fig. 4 to be broken into lengths manually and with relatively little effort.

The structure in Fig. 4 is conveniently made of a length of rod with an outer diameter equal to the outer diameter of the sections 19 and such rod is then threaded through its length, after which the reduced connecting portions 20 are made by a cutting tool of a width equal to the width of the space between the adjacent sections 19.

The structure shown in Fig. 4 may be any length that is convenient and for example may be 2, 3, 4 or more feet in length.

As the distance between the length of pipe 15 and the supporting beam 11 depends on circumstances and varies greatly in different jobs and in different portions of the same job, it is necessary to have a connecting member between the plate 10 and the collar 14 which positions the plate 10 and the collar 14 properly with respect to each other so that the pipe 15 may be maintained either horizontally or have any slope throughout its length that may be desirable.

Pursuant my present invention the above objectives are accomplished by breaking off from the indeterminate length of member shown in Fig. 4, a length comprising as many of the sections 19 as will make up the required distance between the plate 10 and the collar 14, for each individual installation. For example in Figs. 1 and 2, nine sections 19 are required, and such length may be broken off from, for example, a length of member in which there may be twenty, thirty, or more such sections 19. A length broken off therefore has one of the end sections 19 screwed into the internally threaded lug 18, and the collar 10 is then screwed on to the other end section 19. The collar 10 may be rotated to the right or left until the collar 14 is properly positioned, after which the screws 12 are utilized to hold the plate 10 in proper position on the beam or other structure 11.

Referring now to Figs. 5, 6, and 7, there is shown a hanger embodying my invention. Such hanger has a plate 21 with an internally downwardly depending lug 22 attached to a beam 23 by screws 24 and a sectional pipe holding collar composed of an upper section 25 having an internally threaded lug 26 and also provided with outstanding members 27 perforated to permit the passage of the body portion of round head screws 28. Associated with the upper section 25 is a corresponding lower section 29 provided with extensions 30 perforated to allow the passage of the screws 28 on the end of which screws may be placed nuts 31. The sections 25 and 29 hold the pipe 15 in position without the aid of set screws, as in the case illustrated in Figs. 1 and 2.

The plate 21 and upper section 25 are connected by a length of the threaded member shown in Fig. 4. The method of assembly is as above described in connection with Figs. 1 and 2.

Whereas I have described my invention by reference to specific forms thereof, it will be understood that many changes and modifications may be made without departing from the spirit of the invention.

I claim:

1. An improved hanger for pipes and the like, comprising a plate for securement to a wall or other support, said securement plate being provided with a threaded recess, a pipe holder, said pipe holder being provided with a threaded recess, and means of selectable length for interconnecting said pipe holder relative to said plate, said selectable length means comprising a plurality of threaded members arranged in series relation, the respective threaded members being interconnected by a frangible member of less diameter than the threaded members, the threading of said members corresponding respectively with the threading of the threaded recesses of said securement plate and of said pipe holder.

2. An improved hanger for pipes and the like comprising a plate for securement to a wall or other support, a pipe holder, means for adjusting a pipe relative to said holder, and a connecting means for maintaining the plate and pipe holder in relative spaced relation to each other comprising a plurality of threaded members arranged in series relation and with each threaded member connected to the adjacent threaded member by a frangible member of less diameter than the threaded members.

EDWARD S. CORNELL, Jr.